W. DAWSON.
Car Truck.

No. 54,125

Patented Apr. 24, 1866.

Witnesses:
D. W. Stetson
D. L. Freeborn

Inventor:
Walter Dawson

United States Patent Office.

WALTER DAWSON, OF POTTSVILLE, PENNSYLVANIA.

IMPROVEMENT IN CAR-TRUCKS.

Specification forming part of Letters Patent No. 54,125, dated April 24, 1866.

*To all whom it may concern:*

Be it known that I, WALTER DAWSON, of Pottsville, in the county of Schuylkill and State of Pennsylvania, have invented certain new and useful Improvements in the Connection of Railroad-Trucks to Cars, Locomotives, &c.; and I do hereby declare that the following is a full and exact description thereof.

The object of my invention is to promote the safety of the car when the truck becomes broken or otherwise injured, and to more efficiently prevent any very great disturbance in the position or twisting around of the truck when the car or locomotive runs off the track.

It is common, in the construction of rolling-stock, to provide what are called "check-chains," to limit the extent to which the trucks are allowed to swivel; but these chains are not as effective as my invention in attaining that end, and they obviously give no support in the vertical direction. Check-chains do not aid the truck in supporting the car on three or two wheels in case a portion of the truck is disabled.

My invention consists in providing bearings over or near each axle adapted to allow all the vertical play and all the swiveling motion which is required in traveling over the ordinary inequalities in the road, and so arranged as to offer a firm support and prevent the truck both from tilting or swiveling beyond the proper amount. It may be used either with or without the ordinary check-chains, and does not interfere with the employment of side bearings, springs, bolsters, and all the ordinary appurtenances heretofore used in connection with this class of structures.

I will first proceed to describe what I consider the best mode of carrying out my invention, and will afterward point out what I consider new.

The accompanying drawings form a part of this specification.

Figure 1:
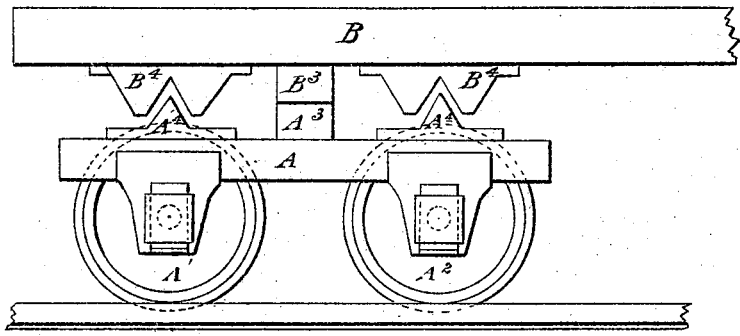
Figure 2:
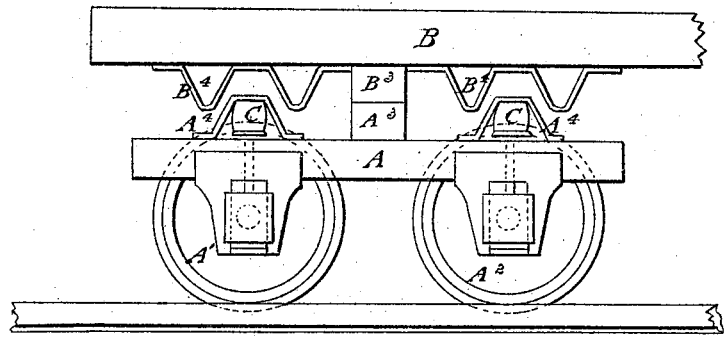
Figure 3:
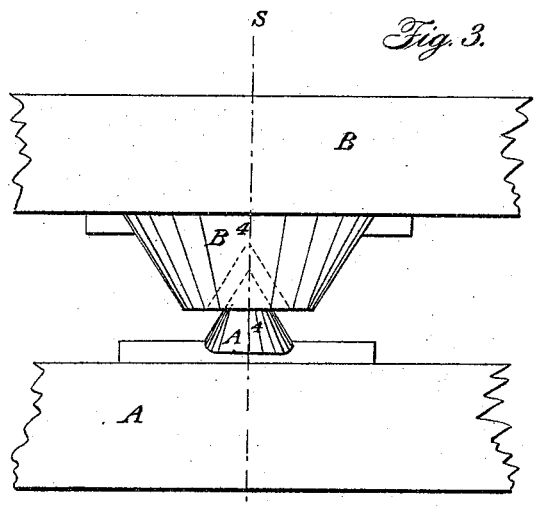
Figure 4:
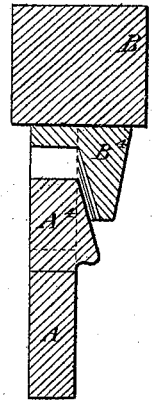

Figure 1 is a side view of a portion of a car constructed according to my invention, having the novel parts of wood or cast-iron. Fig. 2 is a corresponding view, having the novel parts of wrought-iron, adapted to support a spring above the truck over each of the bearings in the manner practiced to a great extent on some railroads. Fig. 3 is a side view, and Fig. 4 is a cross-section, of a modification of the form of the novel parts.

The drawings represent the novel parts with so much of the other parts as is necessary to indicate their relation thereto.

Similar letters of reference indicate like parts in all the figures.

A is the framing, A' the forward wheels, and $A^2$ the rear wheels, of a truck constructed in any of the approved styles.

B is one of a pair of timbers of moderate depth, extending longitudinally under the body of the car.

$B^3$ is one of the side bearings, which presses upon the corresponding bearing $A^3$ on the truck-framing.

The center bearing, (not represented,) as also the side bearings, brakes, and all the ordinary mechanism of the truck, may be constructed and arranged according to any ordinary plan.

$A^4$ $A^4$ are stout pieces formed and bolted on the framing A of the truck in the positions represented. There are four of these, two over each axle, the truck being one of the ordinary four-wheel trucks. These pieces $A^4$ have their sides inclined, as represented, and stand under and are partially inclosed by the correspondingly hollowed or inverted V-shaped bearings $B^4$, which are bolted in the positions represented on the string-pieces B, under the car-body.

The side bearings, $A^3$ and $B^3$, in conjunction with the center bearing, (not represented,) support the load which is imposed upon the truck in the ordinary manner so long as the truck is in good condition, and the slight tilting motions and the considerable swiveling motions which are experienced in the working of railroads are allowed to be performed in the ordinary manner without bringing the bearings $A^4$ and $B^4$ into contact; but the moment a wheel breaks, or an axle or jaw shall become broken or in any manner seriously deranged or displaced so as to fail to contribute properly to the support of the truck, the truck tilts down at the unsupported part only a little more than the ordinary tilting before the bearings $A^4$ and $B^4$ over the sound and undamaged portions of the truck come into play, and support the car firmly and strongly until the train can be stopped and the mischief can be repaired. The car or locomotive, with one wheel or one entire axle wanting, may be supported efficiently by the aid of the bearings $A^4$ and $B^4$ over the parts which remain unaffected, and the structure may be run in this condition for a long distance in safety.

Fig. 2 shows the same parts correspondingly lettered, and with but a slight modification in the shape. The parts $A^4$ serve as a housing or protect the rubber springs C in the same manner as the ordinary straps employed for that purpose. The bearings $A^4$ and $B^4$ in this figure are both made of wrought-iron.

Fig. 3 is a side view, and Fig. 4 a cross-section, showing the bearing $B^4$ extended across outside of the bearing $A^4$, so as to house or inclose the part $A^4$ laterally as well as in front and rear. This modification of the form of the parts may be easily made in cast-iron, and it may be preferable in some situations on account of the increased security it will afford. The action of this form of the invention will be the same as the other, liberty being, of course, allowed for a considerable side motion of the part $A^4$ before it comes in contact with the side of the part $B^4$. I prefer to round or make nearly conical the part $A^4$, where this form of the construction is adopted, and to give a corresponding form to the hollow interior of the part $B^4$.

The effect of placing the bearings $A^4$ and $B^4$ directly over the axles, as represented, is to throw the load directly thereon whenever these bearings become effective. The pieces $A^4$ and $B^4$ may be moved farther outward from the side bearings, or farther toward the extreme front and rear of the truck, if preferred. The effect of such a change of position will be to divide the load between these novel parts and the ordinary side bearings and center bearings, and this modification of the invention may operate very successfully in cases where the center bearing or side bearings remain perfect; but I prefer to place the parts $A^4$ and $B^4$ directly over the axle, as represented, so that the load bearing on the axle may be supported entirely by my bearings, without any necessary dependence on the ordinary bearings at the center and side of the truck. I believe the support rendered by my improvement may thus be easily made so efficient that not only an entire pair of wheels, but the whole of one end and middle of a truck may be removed without entirely destroying the support. In other words, the car or locomotive or tender, or whatever may be the character of the load resting on the parts B, may be supported entirely by the aid of a single pair of wheels and axle, the strain being transmitted through one pair of bearings, $B^4$ and $A^4$, the truck being supposed to be broken off between these bearings and the ordinary side bearings, $A^3$.

The parts $A^4$ and $B^4$ may be duplicated and placed, one set a little in advance and the other a little in the rear, of the positions represented, if desired, but I do not consider it generally necessary.

Having now fully described my invention, what I claim as new, and desire to secure by Letters Patent, is as follows:

The bearings $A^4$ and $B^4$, or their equivalents, arranged relatively to the truck and to the load, substantially in the manner and for the purpose herein set forth.

WALTER DAWSON.

Witnesses:
   D. W. STETSON,
   D. L. FREEBORN.